(12) United States Patent
Gard et al.

(10) Patent No.: US 7,999,551 B2
(45) Date of Patent: Aug. 16, 2011

(54) METHOD FOR DETECTION OF SIGNAL SOURCE USING ESTIMATION OF NOISE STATISTICS

(75) Inventors: Michael F. Gard, Perry, OK (US); Scott Bryan Cole, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 341 days.

(21) Appl. No.: 12/296,027

(22) PCT Filed: Apr. 4, 2007

(86) PCT No.: PCT/US2007/008352
§ 371 (c)(1),
(2), (4) Date: Oct. 3, 2008

(87) PCT Pub. No.: WO2007/114923
PCT Pub. Date: Oct. 11, 2007

(65) Prior Publication Data
US 2009/0278542 A1    Nov. 12, 2009

Related U.S. Application Data

(60) Provisional application No. 60/744,233, filed on Apr. 4, 2006.

(51) Int. Cl.
*G01V 3/00* (2006.01)
(52) U.S. Cl. .................................................... 324/336
(58) Field of Classification Search .................... None
See application file for complete search history.

(56) References Cited

U.S. PATENT DOCUMENTS

| 5,467,083 | A | 11/1995 | McDonald et al. |
| 5,903,819 | A | 5/1999 | Romesburg |
| 5,907,242 | A * | 5/1999 | Gard .............................. 324/326 |
| 6,315,062 | B1 | 11/2001 | Alft et al. |
| 6,411,094 | B1 * | 6/2002 | Gard et al. ..................... 324/326 |
| 6,435,286 | B1 | 8/2002 | Stump et al. |
| 7,038,454 | B2 * | 5/2006 | Gard et al. ..................... 324/326 |
| 7,663,373 | B1 * | 2/2010 | Gard et al. ..................... 324/346 |
| 7,759,824 | B2 * | 7/2010 | Gard et al. ........................ 307/85 |
| 7,885,632 | B2 * | 2/2011 | Wangsness et al. ........... 455/324 |
| 2002/0190718 | A1 * | 12/2002 | Gard et al. ..................... 324/326 |
| 2006/0244454 | A1 * | 11/2006 | Gard et al. ..................... 324/326 |
| 2006/0254820 | A1 * | 11/2006 | Cole et al. ........................ 175/45 |
| 2009/0085568 | A1 * | 4/2009 | Cole .............................. 324/329 |
| 2010/0289496 | A1 * | 11/2010 | Cole et al. ..................... 324/343 |
| 2010/0301866 | A1 * | 12/2010 | Blessum et al. ............... 324/326 |

FOREIGN PATENT DOCUMENTS

WO    2004113675 A1    12/2004

\* cited by examiner

*Primary Examiner* — Jermele M Hollington
(74) *Attorney, Agent, or Firm* — Tomlinson Rust McKinstry Grable

(57) ABSTRACT

A method for noise signal analysis and communication with an underground transmitter. The method comprises the steps of measuring a noise floor when no signal is transmitted from a transmitter, detecting a signal when the transmitter is transmitting, and estimating the noise free component of the signal by removing the noise floor measurement. The measurement of the noise floor and detecting the signal from the transmitter may be done using a root mean square technique. The noise floor measurement can be removed from the measured signal by subtracting the noise floor measurement from the measured signal or alternatively by calculating the square root of the difference between the square of the measured signal and the square of the noise floor measurement. The noise estimation technique may be used in connection with, a differential phased shift keying communication scheme or other modulation techniques.

23 Claims, 3 Drawing Sheets

US 7,999,551B2

METHOD FOR DETECTION OF SIGNAL SOURCE USING ESTIMATION OF NOISE STATISTICS

CROSS REFERENCE TO RELATED APPLICATION

This application claims the benefit of provisional patent application Ser. No. 60/744,233 filed on Apr. 4, 2006, the entire contents of which are incorporated herein by reference.

FIELD OF THE INVENTION

The present invention relates to the field of directional drilling, and particularly to a method for analyzing signals received from a below ground transmitter.

SUMMARY OF THE INVENTION

The present invention comprises a method for analyzing signals transmitted from a below ground transmitter. The method comprising the steps of obtaining a noise measurement at an above ground location when no signal is transmitted from a below ground transmitter, transmitting an electromagnetic signal from the transmitter, detecting the electromagnetic signal at the above ground location, and estimating a noise free component of the detected signal. The noise measurement obtained at the above ground location has a magnitude. The detected signal has a magnitude and a noise free component. The noise free component of the signal is estimated by removing the noise measurement magnitude from the detected signal magnitude.

In another embodiment, the invention comprises a method for analyzing signals transmitted from a below ground transmitter. The method comprising the steps of obtaining a noise measurement at an above ground location when no signal is transmitted from a below ground transmitter, transmitting an electromagnetic signal from the transmitter, modulating information representing an operational parameter of the transmitter onto the electromagnetic signal, detecting the electromagnetic signal at the above ground location, estimating a noise free component of the detected signal, and determining a location of the transmitter, a depth of the transmitter, or flux angles using the noise free component of the signal. The noise measurement obtained at the above ground location has a magnitude. The detected signal has a magnitude and a noise free component. The noise free component of the signal is estimated by removing the noise measurement magnitude from the detected signal magnitude.

DETAILED DESCRIPTION OF THE PREFERRED EMBODIMENTS

The Horizontal Directional Drilling (HDD) industry traditionally uses walk-over tracking to follow the progress of a bore, to find the surface location immediately above the drill bit, and to determine the depth of the drill bit from that surface location. The primary tracking tools are a subsurface transmitter and a hand-carried surface receiver. The transmitter, located in or very near a boring tool, generally emits a magnetic dipole field created by a single coil dipole antenna. The transmitted dipole field can be used for both location and communication with the above ground receiver. One skilled in the art will appreciate the use of the dipole field to determine depth from signal strength or the calculation of flux angles, the tangent of the magnetic flux lines of the field. The depth determination process, as well as other measurements and calculations inherent to HDD operations, is known to be influenced by electromagnetic noise. Receiver accuracy is ultimately limited by noise floor, a problem well known in the art.

Those skilled in the relevant subject matter in physics and electronics know any realizable receiver cannot be noiseless. This conclusion involves the concepts of random thermal noise in resistive components, noise bandwidth of the receiver signal channel, and the notion of the noise floor—a limiting noise condition describing the best possible low-signal performance of which a receiver is capable. Considerable engineering effort is spent to reduce the noise floor and to extract usable signal in a noisy environment. Thus, any technique proving improved depth estimation accuracy or improved data communication reliability in the presence of noise remains of great interest and represents a commercial advantage. The invention disclosed herein provides a simple yet effective technique to improve accuracy of calculations and measurements with signals in the presence of very severe noise. In addition to improved depth determinations in the presence of noise, the invention may be beneficial in making other determinations inherent to HDD operations when in the presence of noise, such as the improved ability to detect or demodulate weak modulated signals or to calculate flux angles.

Figure 1:
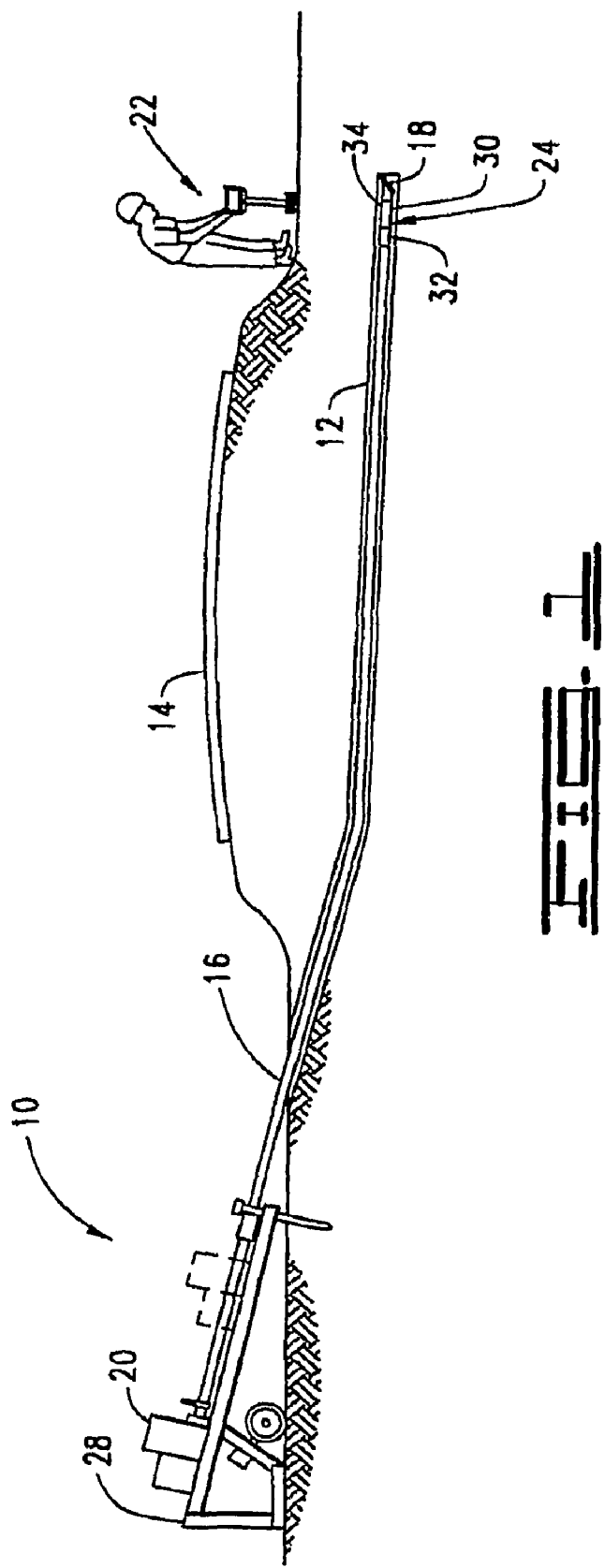
FIG. 1 is a front perspective view of a work machine having a control system built in accordance with the present invention.

With reference now to the drawings in general, and FIG. 1 in particular, there is shown therein a HDD system 10 for use with the present invention. FIG. 1 illustrates the usefulness of horizontal directional drilling by demonstrating that a borehole 12 can be made without disturbing an above-ground structure, namely a roadway or walkway as denoted by reference numeral 14. To cut or drill the borehole 12, a drill string 16 carrying a drill bit 18 is rotationally driven by a rotary drive system 20. When the HDD system 10 is used for drilling a borehole 12, monitoring the position of the drill bit 18 is critical to accurate placement of the borehole and subsequently installed utilities. The present invention is directed to a tracking system 22 and method for tracking and monitoring a downhole tool assembly 24 during a horizontal directional drilling operation.

The HDD system 10 comprises the drilling machine 28 operatively connected by the drill string 16 to the downhole tool assembly 24. The downhole tool assembly 24 preferably comprises the drill bit 18 or other directional boring tool, and an electronics package 30. The electronics package 30 comprises a transmitter 32 for emitting a signal through the ground. Preferably the transmitter 32 comprises a dipole antenna that emits a magnetic dipole field. The electronics package 30 may also comprise a plurality of sensors 34 for detecting operational parameters or characteristics of the downhole tool assembly 24 and the drill bit 18. The plurality of sensors 34 may generally comprise sensors such as a roll sensor to sense the roll position of the drill bit 18, a pitch sensor to sense the pitch of the drill bit, a temperature sensor to sense the temperature in the electronics package 30, and a voltage sensor to indicate battery status. The information detected by the plurality of sensors 34 is preferably communicated from the downhole tool assembly 24 on the signal transmitted by the transmitter 32 using any of various modulation or other known techniques.

At the tracking system 22, the signals from the transmitter 32 are received and used to determine the location of the drill bit 18. Determination of the location of the drill bit 18 and the transmitter 32 may vary depending on the type and capabilities of the tracking system 22. The location determination may comprise a three-dimensional relationship between the tracking system 22 and the drill bit 18, a two-dimensional indication of a point on the ground combined with a depth calculation, or a depth indication alone. Regardless of the tracking system 22 used, noise affects on the signals from the transmitter 32 may be removed. The present invention provides a method to account for the affects of noise on transmitted signals. For purposes of discussing the present invention, the invention will be discussed at times with respect to the determination of depth of the drill bit 18 or transmitter 32. However, the invention could equally be applicable to other aspects of the determination of location of the drill bit 18.

The method comprises obtaining at the tracker system 22 a zero-signal noise measurement followed by an equivalent measurement of a noise-corrupted signal from the transmitter 32. The noise-corrupted signal is corrected for noise-related error by mathematical operations and used for subsequent calculations, such as to provide an improved depth estimate. This technique has been studied by mathematical simulations which indicate the invention is beneficial for signal with even extreme noise corruption—one simulated case used a signal-to-noise ratio of 0.25 (which is to say, noise was four times greater than signal). Preferably, the beacon transmitter 32 will transmit a phase-modulated or narrowband FM signal at essentially constant amplitude. The invention may be adapted to binary AM transmission (On-Off Keying) and many other modulation techniques. The invention assumes the tracking system 22 is calibrated to the beacon 32 in a conventional quiet-field calibration step. Calibrations are preferably done using rms signal calibrations, as discussed below.

The invention requires an occasional quiet interval during which the beacon transmitter 32 does not transmit. This quiet interval is used by the tracking system 22 to obtain an estimate of the local noise condition, or the local noise floor. Preferably, a noise measurement is obtained when the transmitter 32 is not transmitting, the measurement having a magnitude representative of the noise floor. More preferably, the noise measurement is made using a discrete root-mean-square (rms) noise calculation, which may be defined as $$Noise_{rms} = \sqrt{\frac{1}{N}\sum_{0}^{N-1} n(i)^2}$$

where N represents the number of samples of the time-sampled noise waveform n(t). The noise waveform is assumed to be additive white Gaussian noise, although in practice it is sufficient that the noise signal approximate additive white Gaussian noise in the spectral band of interest. The calculation is simple: each of N sample values is squared, added to form the sum of all squared sample values, divided by N to determine the average squared sample value, and square rooted to determine the rms value.

When the beacon 32 is transmitting, detection of the transmitted electromagnetic signal initiates a similar rms calculation using a sample sequence of the noise-corrupted detected electromagnetic signal from the transmitter, ns(t).

$$NoisySig_{rms} = \sqrt{\frac{1}{N}\sum_{0}^{N-1} ns(i)^2}$$

RMS values are useful because they are related to the concept of average signal power over the sample interval.

In the case of additive white Gaussian noise, signal and noise appear in quadrature. Using this information, we may estimate the noise-free signal component from the rms values calculated for the magnitude of received noise-corrupted signal and the magnitude of the zero-signal noise estimate:

$$SigEst_{rms} = \sqrt{NoisySig_{rms}^2 - Noise_{rms}^2}$$

This estimated value, a scalar quantity rather than a time series, is used with the calibration coefficient to provide a conventional depth estimate. In an alternative embodiment, the noise-free component of the detected signal may also be calculated as the difference between the noise floor measurement and the transmitted signal measurements as follows:

$$SigEst_{dif} = NoisySig - Noise$$

Figure 2:
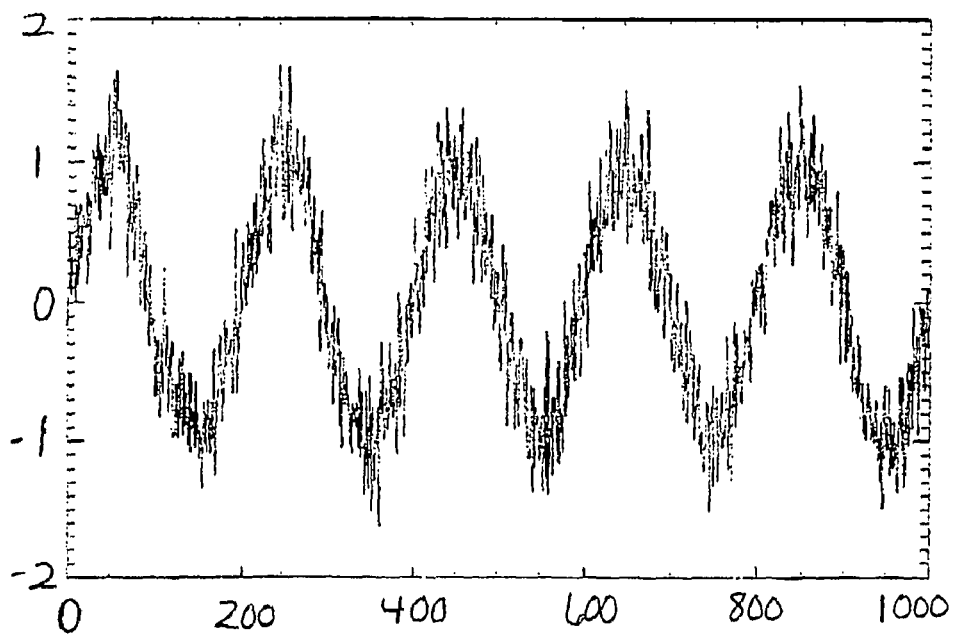
FIG. 2 is an illustration of a wave form having a signal-to-noise ratio of 4:1.
Figure 3:
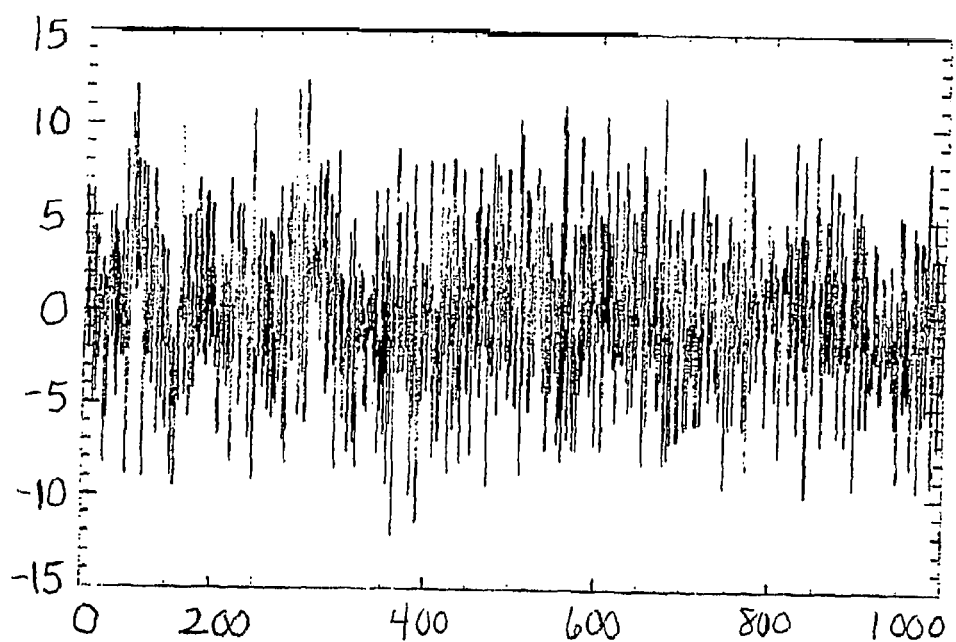
FIG. 3 is an illustration of a wave form having a signal-to-noise ratio of 0.25:1.

Noise simulations were used to study the problem. The signal was assumed to be five complete cycles of a unity-amplitude sinusoid [sin(2π ft)] sampled at a rate of 200 samples/cycle for a total of 1000 samples. Noise samples were normally-distributed, floating-point, pseudo-random numbers with zero mean and unity standard deviation. Signal-to-noise ratio was controlled by scalar multiplication of the noise sample sequence before addition to the signal samples. Signal-to-noise ratios varied from 4:1 (a good quality signal shown in FIG. 2) to 0.25:1 (a very poor quality signal shown in FIG. 3). Results of these studies are summarized in the graph attached as FIG. 4.

Figure 4:
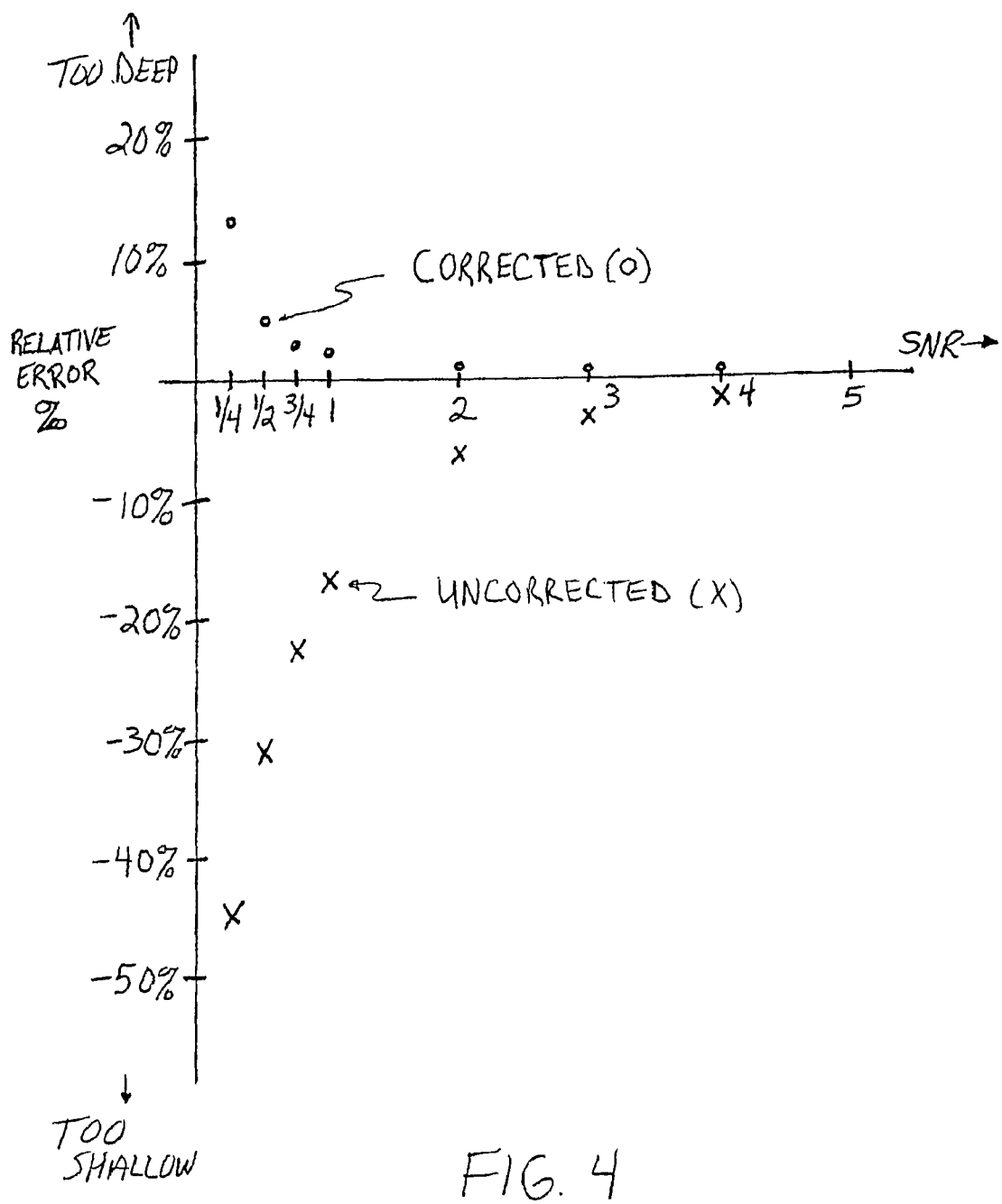
FIG. 4 is a graphical plot of noise corrupted depth errors compared with depths from signals with estimated noise removed.

FIG. 4 illustrates that noise-corrupted depth estimates underestimate transmitter 32 depth—this conforms to field experience when using a single-point calibrated beacon-tracker pair. Note that use of the noise-corrected signal obtained using the $SigEst_{rms}$ estimate typically reduces the error by a factor of four or greater, and also tends to produce a consistently deep depth estimate. This may suggest rms scalar calculations are not optimal for depth estimation purposes, although they certainly are a very efficient selection for computational purposes. Even so, the accuracy obtained from rms calculations is still acceptable—the very poor quality signal shown in FIG. 3, once corrected, produced a depth estimate only slightly outside the normal 10% accuracy tolerance, whereas the uncorrected depth estimate was roughly 45% too shallow.

The present invention may be beneficially used in conjunction with various communication schemes used in the HDD industry. In a preferred embodiment, the noise floor determinations are used in a communication scheme representing a modification of differential phase shift keying (PSK). A differential PSK communication technique, or a standard PSK scheme, provides the advantage of using a signal that has constant amplitude and is always on, so that signal measurements can be made at any time. For use with the present invention, a communication protocol provides the tracker system 22 with knowledge of when the transmitter 32 will be "off". During the "off" transmission period, the tracker system 22 will obtain measurements representative of the noise floor. When the transmitter 32 begins transmitting again, the tracker system 22 may begin recognition of the PSK communication from the transmitter and obtain information communicated by the transmitter.

For example, the communication protocol may require that the transmitter 32 communicate roll, pitch, battery level, temperature and other data to the tracker system 22 in data packets of a known duration. The communication protocol may also require the transmitter 32 use a sequence of communication such as roll, pitch, roll, temperature, roll, battery level, roll, noise, roll, pitch, etc. The tracker system 22 can be programmed to expect that after battery level and then roll data are communicated, the transmitter 32 will turn "off" for a data packet, during which time the tracker system would measure the noise floor. When the transmitter 32 begins communication again, the tracker system 22 will begin synchronization for transmission of further data using the PSK communication scheme. The communication protocol may also suggest that the transmitter 22 turn "on" slightly before an end portion of the "off" data packet so that PSK synchronization can be done more efficiently and without undue loss of communication time.

The use of such a communication protocol, in combination with a PSK scheme, is advantageous in that it allows for communication of necessary data from the transmitter 32 using a transmitted signal that is "on" for maximum time so that depth and signal amplitude measurements are readily available. Such a protocol and scheme also provides for regular measurement of the local noise floor.

Although the technique of the present invention has been examined in a discussion primarily concerned with depth estimation, the invention is equally useful in any application requiring accurate estimation of a signal corrupted by additive white Gaussian noise. For example, another application typical of the underground construction industry is the determination of certain magnetic flux field angles, which typically involve the arctangent of the ratio of two antenna signal amplitudes. The present technique may also be employed to successfully make these angle determinations. Alternatively, signal demodulation processes could also benefit from the technique, as noted earlier.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

The invention claimed is:

1. A method for analyzing signals transmitted from a below ground transmitter, the method comprising the steps of:
obtaining a noise measurement at an above ground location when no signal is transmitted from a below around transmitter, the noise measurement having a magnitude:
transmitting an electromagnetic signal from the transmitter;
detecting the electromagnetic signal at the above ground location by measuring a detected electromagnetic field transmitted by the transmitter by taking measurement samples during a period of time and calculating the root mean square of the measured field samples to reduce signal error, the detected signal having a magnitude with a noise free component; and
estimating the noise free component of the detected signal by removing the noise measurement magnitude from the detected signal magnitude.

2. The method of claim 1 wherein the step of obtaining a noise measurement comprises the steps of:
measuring a detected electromagnetic field by taking measurement samples during a period of time; and
calculating the root mean square of the measured field samples.

3. The method of claim 1 further comprising the step of calculating a depth of the transmitter using the noise free component of the signal.

4. The system method of claim 1 further comprising the step of determining a location of the transmitter using the noise free component of the signal.

5. The method of claim 1 further comprising the step of calculating flux angles using the noise free component of the signal.

6. The method of claim 1 wherein the step of estimating a noise fee component comprises the step of calculating the square root of the difference between the square of the detected signal magnitude and the square of the noise measurement magnitude.

7. The method of claim 6 further comprising the step of calculating a depth of the transmitter using the estimated noise free component of the electromagnetic signal.

8. The method of claim 1 wherein the step of estimating a noise free component comprises the step of calculating the difference between the detected signal magnitude and the noise measurement magnitude.

9. The method of claim 8 further comprising the step of calculating a depth of the transmitter using the noise free component of the electromagnetic signal.

10. The method of claim 1 further comprising the step of modulating information representing an operational parameter of the transmitter onto the signal transmitted from the transmitter.

11. The method of claim 10 wherein the step of modulating information onto the signal comprises a phase shift keying communication scheme.

12. The method of claim 11 wherein the step of modulating information onto the signal further comprises a communication protocol, the communication protocol identifying a period of time in which the transmitter is turned off.

13. The method of claim 10 wherein the operational parameter comprises roll.

14. The method of claim 10 wherein the operational parameter comprises battery level.

15. A method for analyzing signals transmitted from a below ground transmitter, the method comprising the steps of:
obtaining a noise measurement at an above ground location when no signal is transmitted from a below ground transmitter, the noise measurement having a magnitude;
transmitting an electromagnetic signal from the transmitter;
modulating information representing an operational parameter of the transmitter onto the electromagnetic signal;
detecting the electromagnetic signal at the above ground location, the detected signal having a magnitude and a noise free component;
estimating the noise free component of the detected signal by removing the noise measurement magnitude from the detected signal magnitude; and
determining a location of the transmitter, a depth of the transmitter, or flux angles using the noise free component of the signal.

16. The method of claim 15 wherein the operational parameter comprises roll.

17. The method of claim 15 further comprising the step of calculating a depth of the transmitter using the noise free component of the electromagnetic signal.

18. The method of claim 15 wherein the step of modulating information onto the signal comprises a differential phase shift keying communication scheme.

19. A method for analyzing signals transmitted from a below ground transmitter, the method comprising the steps of:
   obtaining a noise measurement at an above ground location when no signal is transmitted from a below ground transmitter, the noise measurement having a first magnitude;
   transmitting an electromagnetic signal from the transmitter;
   detecting the electromagnetic signal which may be corrupted by noise at the above ground location and obtaining a noise corrupted signal measurement, the noise corrupted signal measurement having second magnitude;
   estimating the noise free component of the electromagnetic signal at the above ground location by removing the noise measurement magnitude from the noise corrupted signal magnitude; and
   determining a property of the below ground transmitter using the noise free component of the electromagnetic signal.

20. The method of claim 19 wherein the noise measurement is obtained by taking measurement samples and calculating the root mean square of the measured samples.

21. The method of claim 19 wherein the noise corrupted signal measurement is obtained by taking measurement samples and calculating the root mean square of the measured samples.

22. The method of claim 19 wherein the property of the below ground transmitter is location.

23. The method of claim 19 wherein the estimation of the noise free component of the electromagnetic signal is determined by taking the square root of the difference between the square of the noise corrupted signal measurement and the square of the noise measurement.

* * * * *